United States Patent [19]
Scheib

[11] 4,073,589
[45] Feb. 14, 1978

[54] IMPROVED OPTICAL PRINTER

[75] Inventor: Harold A. Scheib, Encino, Calif.

[73] Assignee: Bell & Howell Company, Chicago, Ill.

[21] Appl. No.: 657,341

[22] Filed: Feb. 13, 1976

[51] Int. Cl.² .............................................. G03B 27/48
[52] U.S. Cl. .................................................... 355/50
[58] Field of Search ...................... 355/50, 56, 55, 77, 355/18; 352/242, 166, 136, 138; 242/75.5, 71.1, 71

[56] References Cited

U.S. PATENT DOCUMENTS

| | | | |
|---|---|---|---|
| 1,361,012 | 12/1920 | Capstaff | 355/35 |
| 1,717,404 | 6/1929 | Powrie | 355/77 |
| 2,044,454 | 6/1936 | Wilson et al. | 355/50 X |
| 2,174,931 | 10/1939 | Terry et al. | 352/51 |
| 2,487,476 | 11/1949 | Pratt et al. | 242/75.5 X |
| 2,517,250 | 8/1950 | Shea et al. | 355/56 |
| 2,622,475 | 12/1952 | Tondreau | 355/43 |
| 2,672,074 | 3/1954 | Gunby | 355/50 |
| 2,950,646 | 8/1960 | Blank | 352/138 |
| 2,964,995 | 12/1960 | Tondreau | 352/97 X |
| 3,040,619 | 6/1962 | Oxberry | 355/46 |
| 3,043,187 | 7/1962 | Shaffer | 352/72 |
| 3,122,076 | 2/1964 | Hefley et al. | 352/166 X |
| 3,186,297 | 6/1965 | Wally | 352/242 X |
| 3,263,555 | 8/1966 | Scheib | 355/43 |
| 3,682,540 | 8/1972 | Oxberry et al. | 355/18 |

Primary Examiner—Donald A. Griffin
Attorney, Agent, or Firm—Benoit Law Corporation

[57] ABSTRACT

An improved optical printer utilizes four film magazines of identical construction for selectively supplying photographic film to, and receiving photographic film from, the housing and film transport of a photographic film handling apparatus, such as a camera or a projector. Each magazine has a magazine housing which is releasably attachable to the housing of the film handling apparatus. An electric motor is mounted on the magazine housing in order to drive a film reel or takeup device therein. The electric motor is releasably connected to an electric power source mounted on a stationary structure on which the film handling apparatus housing is disposed. .

3 Claims, 6 Drawing Figures

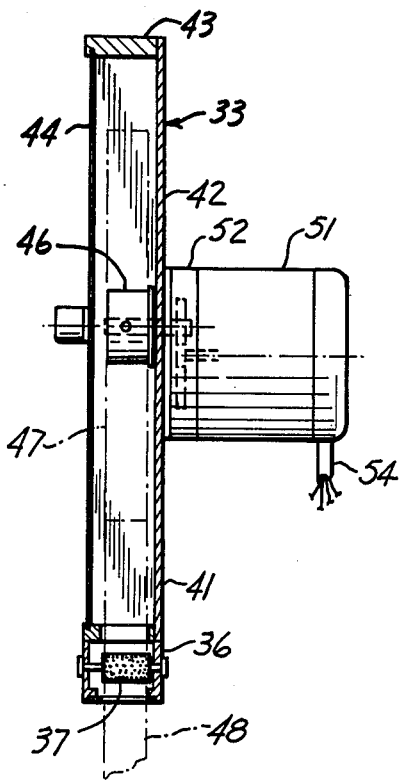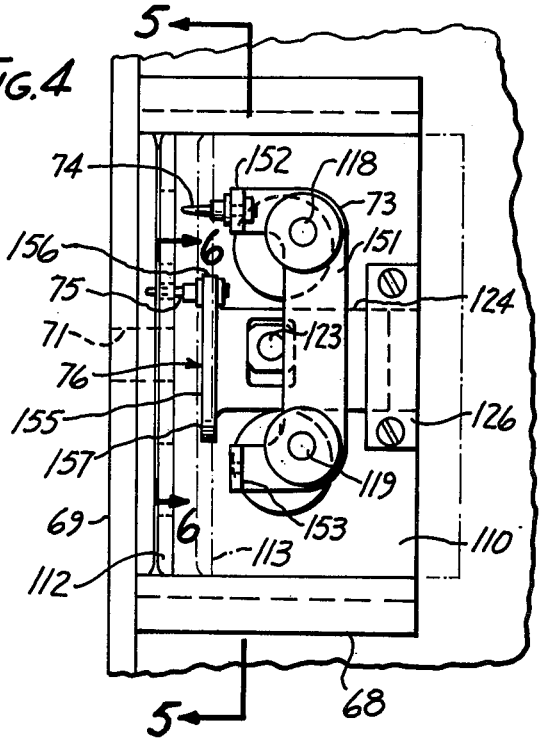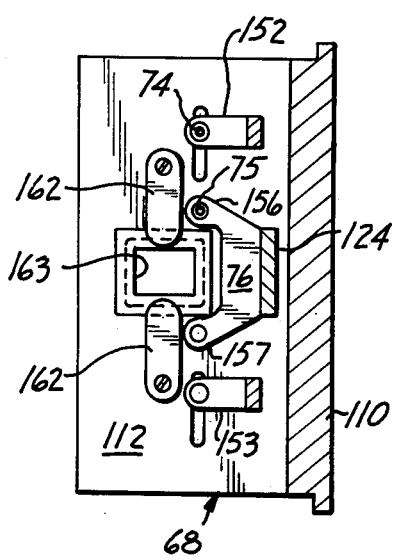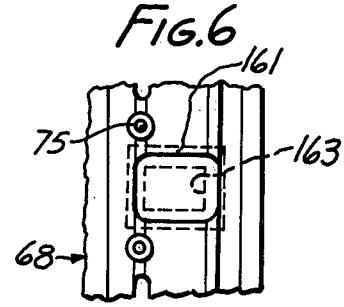

IMPROVED OPTICAL PRINTER

CROSS REFERENCES

Related subject matter may be found in the following copending applications by the same inventor and assigned to the same assignee.

"OPTICAL IMAGE PRINTER", Ser. No. 657,340;

"FILM ADVANCING MECHANISM WITH FILM THREADING FACILITY", Ser. No. 657,342, now U.S. Pat. No. 4,040,730;

"FILM REGISTERING ADVANCING MECHANISM", Ser. No. 657,343, now U.S. Pat. No. 4,037,954.

BACKGROUND OF THE INVENTION

1. Field of the Invention

The subject invention relates to photographic film handling equipment and, more specifically, to optical image printers, cameras, projectors, film magazines, including electrically powered film magazines, easy threading film projectors and cameras, and film advancing mechanism, including intermittent film advancing devices and film registration equipment.

2. Prior Art

Optical image printers and their uses are well known, as may, for instance, be seen from Fielding, THE TECHNIQUE OF SPECIAL EFFECTS CINEMATOGRAPHY (Fletcher & Son Ltd., Revised 3rd. ed. 1974) pp. 150-272.

While such equipment has been developed to a high degree of perfection, as may also be seen from U.S. Pat. No. 3,637,299, by L. W. Butler et al, issued Jan. 25, 1972, and herewith incorporated by reference herein, and from U.S. Pat. No. 3,682,540, by J. W. Oxberry, issued Aug. 8, 1972, its very high price extending from the 40,000 dollar well into the 100,000 dollar area, as well as its bulkiness, complexities and need for highly skilled operators, has discouraged the use of such equipment on a large scale, and has maintained this facility beyond the reach of the vast majority of educational institutions and the motion picture amateur and experimental fields.

Similarly, while combined camera and projector apparatus have been proposed in the past, as may, for instance, be seen from U.S. Pat. No. 2,950,646, by F. A. Blank, issued Aug. 30, 1960, existing designs and constructions in this area do not lend themselves to any significant acceptance and use of combined camera and projector equipment.

In the photographic film magazine area, the most prevalent prior-art design maintains the drive of the reel or film takeup member separate from, and relatively stationary to, the film magazine. This requires the provision of engageable and disengageable drive shaft equipment, which is relatively costly, vulnerable to careless handling, and otherwise subject to wear. Against this background, the U.S. Pat. No. 3,043,187, by A. Shaffer, issued July 10, 1962, proposes the provision of both the reel drive and its power source in the form of a coil spring in the magazine itself. Placement of the power source within the magazine housing has, however, the disadvantage that the duration of usefulness of a magazine with a given load will inevitably be dependent on the capacity of the internal power source, rather than the length of the film supply. Practical considerations also relegate the reenergization of the internal power source to the occasions at which the magazine is reloaded with film, as may be seen from the latter patent. More recent developments have followed this trend and have put an electrical power source or battery into the film magazine itself, as may, for instance, be seen from the camera Model SX-70, by Polaroid Corporation.

In the case of easy threading camera, projector and other film handling equipment, there exists the design drawback that the shutter or film pulldown mechanism is stationary, while other parts, such as the lens assembly, are movable. This, so far, has impeded the use of convenient threading and cleaning techniques in many high-precision applications (see U.S. Pat. No. 3,137,201, by Uterhart).

The utility of motion picture film feeding mechanisms with film registering facility has been recognized in the past, as may, for instance, be seen from U.S. Pat. No. 2,733,633, by L. R. Wottring, issued Feb. 7, 1956. This type of prior-art motion picture film feeding and registering mechanism employed a pivoted frame structure surrounding the film aperture for lever action on the registration pin. Other prior-art designs limited themselves to a stationary registration pin. Still other prior-art equipment, such as rapid film feeding and registering devices used in gun sight cameras, provided a construction which excluded the use of the mechanism in projector apparatus.

SUMMARY OF THE INVENTION

It is a general object of this invention to overcome one or more of the above mentioned disadvantages.

It is a related object of this invention to provide improved optical image printing apparatus.

It is also an object of this invention to economize the design and facilitate the operation of optical image printing equipment.

It is also an object of this invention to provide improved combined camera and projector apparatus.

It is a further object of this invention to provide improved film magazines and film magazine drives.

It is also an object of this invention to provide improved photographic film handling apparatus.

It is a related object of this invention to provide improved photographic film handling apparatus with easy film threading facilities.

It is also an object of this invention to provide improved film transport or advance mechanisms.

It is a related object of this invention to provide improved film feed mechanism having intermittent film advance and film registering facilities.

It is a further object of this invention to provide improved mechanisms of the latter type which are suitable for use in motion picture cameras, as well as projectors and film positioning and illuminating equipment, and also in combined camera and projector apparatus.

The subject invention, from one aspect thereof, resides in an optical image printer wherein images are copied from a first film onto a photographically sensitive second film and, more specifically, resides in the improvement comprising in combination a relatively stationary structure having a bed and including means for providing electric energizing power, a first carriage slidable along the bed, a second carriage slidable along the bed, a projector having a first apparatus including a first housing mounted on said first carriage for receiving the first film and first means in the first housing for positioning the received first film, the projector including means operatively associated with the first apparatus for illuminating the positioned first film and forming a luminous image, a camera operatively associated with the projector and having a second apparatus including a second housing mounted on said second carriage for receiving the second film and second means in the second housing for positioning the received second film, the camera including means operatively associated with the second apparatus for receiving the luminous image from the projector and projecting the received luminous image onto the positioned second film, first, second third and fourth film magazines of idencial construction for selectively supplying and receiving either of the first and second films, each of the first, second, third and fourth film magazines having an individual magazine housing, individual means for rendering the magazine housing light tight, an individual mounting shoe, individual means in the particular magazine housing for coiling either of the first and second films, an individual electric motor coupled to the coiling means for driving the coiling means, and means for mounting the electric motor on the particular magazine housing, means for releasably mounting the first, second, third and fourth magazines, respectively, on a first side of the first housing, on an opposite second side of the first housing, on a first side of the second housing, and on an opposite second side of the second housing via the mounting shoes of the first, second, third and fourth magazines, and means coupled to the electric motor of each film magazine for selectively connecting each electric motor to the electric energizing power providing means.

The subject invention, from another aspect thereof, resides in photographic film handling equipment and, more specifically, resides in the improvement comprising in combination a stationary structure including means for providing electric energizing power, an apparatus housing mounted on the structure, means in the housing for transporting photographic film, a film magazine for selectively supplying photographic film to, and receiving photographic film from, the housing and film transporting means, including a magazine housing, means for releasably mounting the magazine on the apparatus housing, means in the magazine housing for coiling photographic film, an electric motor coupled to the coiling means for driving the coiling means, and means for mounting the electric motor on the magazine housing, and means coupled to the motor and the electric energizing power providing means for releasably connecting the electric motor to the electric energizing power providing means and energizing the electric motor with the provided electric energy.

The subject invention from another aspect thereof, resides in photographic film handling apparatus and, more specifically, in the improvement comprising in combination an apparatus housing structure, means in the housing structure for transporting photographic film, a film magazine for selectively supplying photographic film to, and receiving photographic film from, the housing structure and film transporting means, including a magazine housing, means for releasably housing the magazine housing on the apparatus housing structure, means in the magazine housing for coiling photographic film, an electric motor coupled to the coiling means for driving the coiling means, and means for mounting the electric motor on the magazine housing, means on the housing structure for providing electric energizing power, and means coupled to the motor and the electric energizing power providing means for releasably connecting the electric motor to the electric energizing power providing means and energizing the electric motor with the provided electric energy.

The subject invention from another aspect thereof, resides in photographic film handling apparatus and, more specifically, in the improvement comprising in combination an apparatus housing structure, a film gate in the housing structure having an image aperture, means in the housing structure for transporting photographic film relative to the image aperture, first and second film magazines of identical construction for selectively supplying photographic film to, and receiving photographic film from, the housing structure and film transporting means for transport relative to the image aperture, each of the first and second film magazines including an individual magazine housing, individual means for rendering the magazine housing light tight, an individual mounting shoe, individual means in the particular magazine housing for coiling photographic film, and individual electric motor coupled to the coiling means for driving the coiling means, and means for mounting the electric motor on the particular magazine housing, means for releasably mounting the first and second magazines, respectively, on a first side of the housing structure and on an opposite second side of the housing structure via the mounting shoes of the first and second film magazines, means on the housing structure for providing electric energizing power, and means coupled to the electric motor of each film magazine for selectively connecting each electric motor to the electric energizing power providing means.

BRIEF DESCRIPTION OF THE DRAWINGS

The subject invention and its various aspects and objects will become more readily apparent in the following detailed description of preferred embodiments thereof, illustrated by way of example in the accompanying drawings, in which like reference numerals designate like or functionally equivalent parts, and in which:

FIG. 3 is a section through a film magazine taken along the line 3—3 in FIG. 1;

FIG. 4 is a detail view, on an enlarged scale, of the film advance or shutter mechanism of the camera and projector parts of the optical image printer of FIG. 1;

FIG. 5 is a section taken along the line 5—5 in FIG. 4; and

FIG. 6 is a view taken in the direction of the arrows 6 in FIG. 4.

DESCRIPTION OF PREFERRED EMBODIMENTS

Figure 1:
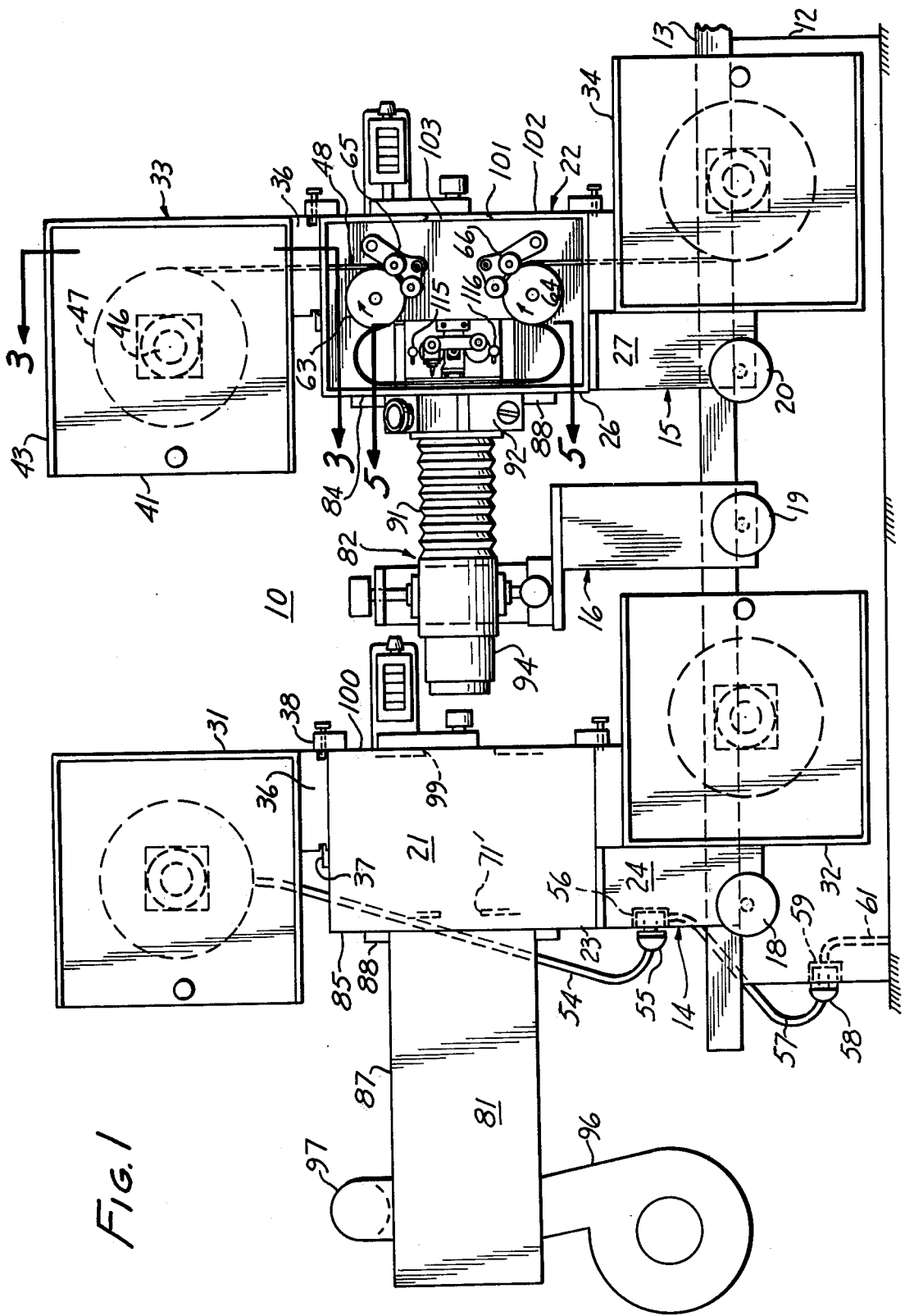
FIG. 1 is an elevation of an optical image printer in accordance with a preferred embodiment of the subject invention.

The optical image printer 10 shown in FIG. 1 has a stationary structure or console 12 including a rail structure or bed 13 on which carriages 14, 15 and 16 are mounted for sliding movement along the bed 13. In practice, ball bearings or other low-friction devices (not shown) may be employed for this purpose. Also, the carriages 14 to 16 may be equipped with knobs or handwheels 18, 19 and 20 for manual propulsion of the carriages via conventional rack-and-pinion mechanism (not shown).

The optical image printer has a projector part 21 and a camera part 22. The projector part 21 includes a housing 23 which is mounted on the carriage 14 by a bracket 24. Similarly, the camera part 22 has a housing 26 mounted by a bracket 27 on the carriage 15. According to an aspect of the invention, the housings 23 and 26 are of identical construction.

The optical image printer 10 also includes a set of four film magazines 31, 32, 33 and 34, two of which are mounted on the projector housing 21, while the remaining two are mounted on the camera housing 26. In accordance with a preferred embodiment of the invention, the four film magazines 31 to 34 are of identical construction. Each housing in the illustrated preferred embodiment is of a square or prismatic configuration.

Each film magazine carries a shoe 36 which has lateral notches for engagement by a fixed fastener 37 and a releasable catch 38 mounted on the housing 21 or 26. To permit the handling of raw or photographically sensitive film, each magazine shoe 36 includes a light trap 37.

Because of the structural identity of the film magazines 31 to 34, the magazines 31 and 32 or 33 and 34 of each pair are attached to the corresponding housing 21 or 26 with their bodies behind the shoe 36 being oriented in different directions as seen in FIG. 1.

According to a preferred embodiment of the subject invention, the film magazine includes a magazine housing 41 attached to the releasable mounting means or shoe 36. The housing 41 has a rear wall portion 42 and a lateral frame or rim portion 43. A door 44 slides in grooves in the rim portion 43 and forms a light-tight lid when closed.

Each film magazine encloses a rotatable hub 46 which may carry a reel 47 for coiling photographic film 48.

Each magazine has its own electric motor 51 coupled to the hub 46 via a reduction gear 52 for driving the hub. In accordance with the illustrated preferred embodiment of the invention, the electric motor 51 is directly mounted on or attached to the rear wall 42 of the magazine, as may best be seen in FIG. 3. Conventional fasteners may be employed for this purpose.

As seen in FIG. 1, each magazine motor has an electric cable 54 which is equipped with a power plug 55. The latter is insertable into an electric power outlet or receptacle 56 in the carriage bracket 24 or 26.

The electric power outlet 56, in turn, has an electric cable 57 equipped with a power plug 58 insertable in a further electric outlet or receptacle 59 in the stationary structure 12. The power outlet 59, in turn, is energized with electric energy via a cable 61 which is connected to a source of electric power (not shown).

In the embodiment shown in FIGS. 1 and 3, each magazine or magazine motor is provided with the same type of electric energizing equipment, so that only the energizing equipment for the magazine 31 has been shown in the drawing.

The cable 61 and the corresponding cables (not shown) for the drive motors for the magazine 32 to 34, may be energized via a control of the type shown in the above mentioned U.S. Pat. No. 3,637,299 which is incorporated by reference herein.

In practice, the provision of each magazine with its own, permanently attached electric motor, and the energization of such magazine motors from a stationary source or power outlet, have been proved very advantageous and have resulted in great savings as compared to equipment in which the drive motors were separate from the magazines and were coupled thereto by drive belts or other mechanical coupling devices.

In principle, the mounting bracket 24 or 27 may be considered part of the housing structure 23 or 26.

In that case, the electric power outlet 56 into which the power plug 55 of the magazine motor cable 54 is inserted, may be considered as being located on the projector or camera housing structure.

In the illustrated preferred embodiment of the invention, not only the housings 23 and 26, but also the film transports in such housings are identical for the projector 21 and the camera 22. Accordingly, only the film transport and positioning equipment of the camera 22 is shown in FIG. 1, it being understood that the same transport and equipment is located in the projector 21 and is oriented therein in the same manner.

The film transport includes the usual sprocket wheels 63 and 64 and pivoted auxiliary roller assemblies 65 and 66. Each of the projector and camera housings 23 and 26 further includes a film advance and positioning mechanism 68 which is shown within the housing 26 in FIG. 1 and on an enlarged scale in FIGS. 4 to 6.

Each film advance mechanism has a film gate 69 having an image aperture 71. A shuttle 73 has a pulldown element or pin 74 which cyclically engages the film at marginal sprockets in order to advance same relative to the image aperture by one frame. The mechanism 68 also has a shuttle 76 which carries and actuates a film registering element or pin 75.

In this manner, film from the supply magazine 32 is advanced toward the takeup magazine 31 and is intermittently positioned at the image aperture of the projector 21.

Similarly, raw or photographically sensitive film is advanced from the supply magazine through the camera 22 to the takeup magazine 34 and, during such advancement, is intermittently positioned at the image aperture of the camera 22.

The projector 23 is equipped with apparatus 81 attached to the housing 21 for illuminating the positioned film at the projector image aperture, shown in dotted outline in FIG. 1 at 71'. In this manner, luminous images are formed on the image frames positioned at the projector aperture 71'.

The camera 22, in turn, is equipped with apparatus 82 for receiving the luminous image from the projector and projecting such received luminous image onto the photographically sensitive film positioned in the camera 22.

This permits a realization of the optical printing technique shown and described in chapters 7 and 9 of the above mentioned book by Fielding, and well known as such in the optical printing art.

In accordance with the illustrated preferred embodiment of the subject invention, the film gate 69 which defines the image aperture 71 is mounted at a first side 84 of the camera housing 26. Similarly, as indicated at 71', the corresponding projector film gate with the projector image aperture is mounted at a first side of the projector housing 21. It will be noted in FIG. 1 that the first housing sides 84 and 85 correspond to each other in terms of orientation; the camera and projector housing 23 and 26 being mounted on the bed 13 so that the first housing sides 84 and 85 face in the same direction.

The projector illuminating equipment includes a lamp housing 87 which is mounted by a flange 88 on the first side 85 of the projector housing 23. Similarly, the camera image receiving and projecting equipment 82 has a bellows 91 and prismatic image viewing equipment 92 attached by the flange 88 to the first side 84 of the camera housing 22.

The camera image receiving and projecting equipment 82 includes a copy lens 94 which is mounted on the separate carriage 16 and connected to the bellows 91. This enables an adjustment of the lens system relative to the positoned film in the camera.

The image illumination apparatus 81 also has an air blower 96 attached to the lamp housing 87 for supplying cooling air thereto, and an angular chimney 97 proceeding from the lamp housing 87 for the exhaust of heated air.

As shown in dotted lines at 99, the projector housing 21 has a cutout in a second side 100 opposite the first side 85 for a passage of the luminous image to the luminous image receiving and projecting lens system 94. Because of the principle of identity of construction and mutual exchangability, the camera housing 22 has a like cutout 101 in its second side 102 opposite the first side 84. A light-tight cover 103 closes the cutout 102 to provide a light-tight camera housing.

The cover 103 may be slidably insertable in the cutout 101, such as by means of a tongue-and-groove or dovetail arrangement.

An identical cover (not shown) may be provided for the projector housing 23 in order to render the projector 21 convertible to a film camera in accordance with a further preferred embodiment of the subject invention.

The equipment shown in the drawings lends itself particularly well to an execution of the rotoscope technique described on pages 269 and 270, and elsewhere in the above mentioned book by Fielding. Briefly, in the exercise of such technique, it is possible in view of the interchangeability of camera and projector to put film into the camera or projector movement and project or rotoscope the image from the film onto the art board (not shown) for the creation of mattes which will selectively illuminate a desirable portion of the film. With these techniques and the equipment of the subject invention, it is relatively easy to create multiple panels, wipes, split screens and miniature matte paintings and to put light into night shots and combine cartoon action with live action. Also, the camera/projector can be used directly in a position closest to an art board (not shown) to achieve a wide variety of animation effects. Moreover, the illustrated equipment, with the aid of a conventional art board, can be employed as a title optical printer which is even capable of executing the sophisticated "burn-in" techniques otherwise achieved only with very expensive and sophisticated equipment.

The equipment of the subject invention thus greatly enriches the motion picture amateur art and puts within the reach of schools and other institutions apparatus for duplicating or executing the most sophisticated professional motion picture techniques.

Referring to FIG. 1, it will be noted that the equipment therein disclosed in effect incorporates a combined photographic film camera and projector apparatus comprising the optical lens system 94, the image illumination system 81 including the lamp housing for projecting light, and at least one of the housings 23 and 26. The illustrated film transport and positioning equipment in such combined camera and projector apparatus can be employed to position photographically sensitive, as well as photographically exposed and developed film. The lens system 94 and the illuminating equipment 82 have in common the fact that they both project light in the same direction relative to the image aperture. This in contrast to the type of prior-art proposal shown in the above mentioned U.S. Pat. No. 2,950,646 wherein the light of luminous images to be photographed was projected into the combined camera and projector apparatus in one direction through a camera lens, and wherein the light from the projector lamp housing for the illumination of film image frames was projected to the image aperture in the opposite direction. While this approach proceeded naturally from the underlying prior-art orientation, it did have the severe drawback of placing the hot light source into the confines of the camera/projector housing, leading to overheating and premature aging of the equipment.

In sharp contrast to this prior-art approach, the illustrated preferred embodiment of the invention mounts both the lens system 94 and the illumination apparatus 81 outside of the camera or projector housing.

The film advancing and positioning meachnism 68 has a carriage 110 which supports the film advance shuttle 73 and film positioning shuttle 76. The shuttle carriage 110 is movable relative to the film gate 69 and aperture 71 for placement of the film advancing mechanism adjacent the aperture 71 in an active position and alternatively at a distance from the aperture 71 in a passive position.

As seen in FIG. 4, this places a film pressure plate 112 at a distance from the film gate (see phantom outline 113) to enable threading of the film without removal thereof from the camera or projector and to permit convenient cleaning operations. Manually actuable screw elements 115 and 116 permit an arrestation of the shuttle mechanism carriage 110 in the active and passive positions as well.

Figure 2:
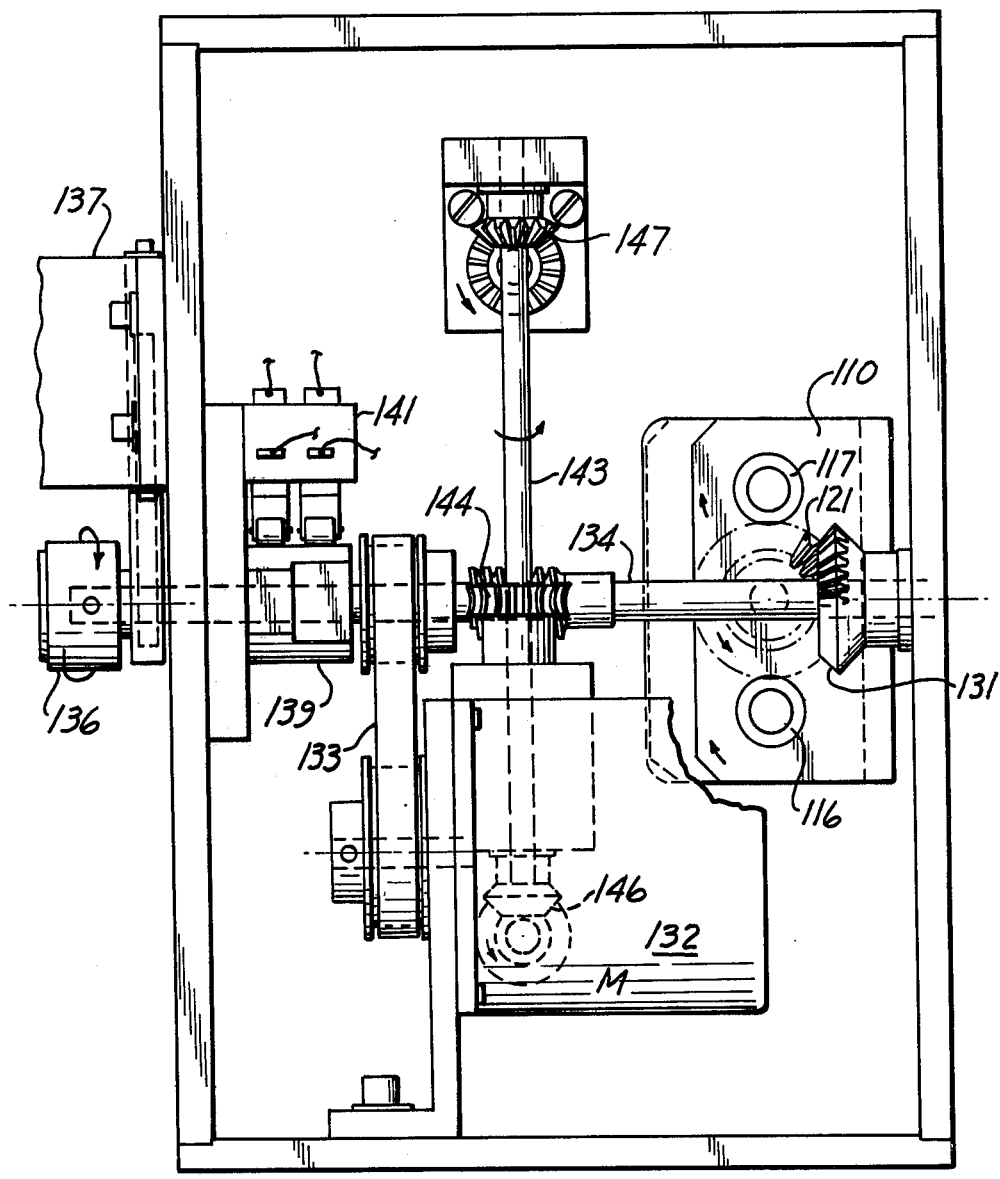
FIG. 2 is a rear view of the projector portion of the optical image printer shown in FIG. 1.

According to FIGS. 2 and 4, the advance shuttle 73 is driven by two gear wheels 116 and 117 and eccentric devices 118 and 119 coupled to these gear wheels.

A further gear wheel assembly 121 has a bevel gear as shown in FIG. 2 and serves also to drive the gear wheels 116 and 117 and eccentric devices 118 and 119.

The bevel gear 121 drives a further eccentric device 123 which acts on a slide 124 to reciprocate the same relative to the image aperture 21 in a guide 126.

The bevel gear 121 in effect serves as an input gear for the film advance and positioning mechanism. This bevel gear 121 is complementary or meshable with a further bevel gear 131 which serves as an output gear of a power drive arrangement including an electric motor 132, a belt transmission 133, and a shaft 134. The motor may be connected to the type of control disclosed in the above mentioned U.S. Pat. No. 3,637,299.

If the carriage 110 shown in FIGS. 2 and 4 is in its active position, then the power output gear wheel 131 is coupled to the power input gear wheel 121. Conversely, the gear 121 is decoupled automatically from the gear 131 when the carriage is moved to its passive position whereby the film pressure plate is spaced as shown in FIG. 4 at 113 for film threading and film passage cleaning purposes.

Referring further to FIG. 2, it will be noted that the power drive shaft 134 is also manually rotatable by an external knob 136 for a manual adjustment of the film image positioning. A counter 137 is coupled to the power shaft 131 in order to furnish to the operator an indication of the number of advanced image frames. By observing the counters of the camera and the projector, the operator can assure perfect spatial synchronism between the films in the camera and in the projector.

The power shaft 134 also carries a cam 139 which acts on an electric switch assembly 141 that may be connected to a conventional control in order to make sure that the projector or camera mechanism completes one full cycle of its operation even if a stop command is issued in the course of any cycle.

As further seen in FIG. 2, the drive mechanism includes a cross shaft 143 which is driven from the power shaft 134 via a worm gear 144 in order to rotate the sprocket wheels 63 and 64 via gears 146 and 147.

This cross shaft arrangement is not only preferred herein because of its uncomplicated nature, but also because of its high precision and reliability of operation.

The shuttle mechanism has a cross member 151 which carries a pair of mounting brackets 152 and 153 for the intermittent pulldown pin 74. Similarly, the shuttle 76 has a bracket 155 which carries a mounting member 156 and an alternative mounting member 157 for the positioning pin 75.

As seen in FIG. 5, all the elements 74, 75, 151, 152, 153, 155, 156 and 157 and all other parts of the film advance and shuttle mechanism are located outside of the image aperture 71 and to one side of that aperture as seen in a direction extending perpendicularly to the plane in which the image aperture 71 is located (e.g., the plane of the paper on which FIG. 5 has been drawn).

This is a very important feature of the illustrated preferred embodiment of the subject invention in that it enables the use of the same shuttle mechanism for camera and projector purposes. If the apparatus is used as a camera, then a solid film pressure plate insert 161 is held in place behind the image aperture by a pair of leaf spring retainers 162 and 163. Conversely, if the equipment is used as a projector, a film pressure plate with an aperture, indicated in dotted outline at 163 in FIG. 6 to enable the copy lens 94 to pick up the luminous image from the projector 21, is substituted for the insert 161.

The mounting members 152 and 153 permit the pulldown pin or claw to be alternatively mounted in one position, as shown in FIG. 4, and in an other position, spaced from that one position and located at the lower mounting member 153. Similarly, the presence of the mounting members 156 and 157 permit the film registering or positioning pin or member 75 to be mounted either in the one position shown in FIG. 4 or in the alternative position at 157.

This, again, is a very important feature of the illustrated preferred embodiment, since it enables the registering pin 75 to act in the camera mode on sprocket holes which correspond to the sprocket holes on which the registering pin acts in the projector mode of the equipment. Similarly, the alternative mounting facilities 152 and 153 enable the pulldown pin 74 to act in the camera mode on sprocket holes which correspond to sprocket holes on which the pulldown pin acts in the projector mode of the illustrated apparatus.

To implement this feature, the pins 74 and 75 are mounted, respectively, on the members 152 and 156 in the camera mode. Conversely, the pins 74 and 75 are mounted on the members 153 and 157, respectively, in the projector mode or projector 21.

During the operation of the equipment, the members 152 and 153 are moved in unison with each other, and the members 156 and 157 are also moved in unison with each other.

In this manner, the greatest mutual accuracy of camera and projector film positioning is achieved with relatively uncomplicated and highly reliable equipment.

It will be recognized at this juncture that many of the devices and features herein disclosed are not limited in their utility to the optical image printer field. This is particularly true for the magazine shown in FIG. 3, the power drive shown in FIG. 2 and the shuttle mechanism shown in FIGS. 4 to 6. A widespread utility also applies to the combined camera and projector equipment implicit in the embodiment shown in FIG. 1.

Moreover, the subject extensive disclosure will suggest and render apparent to those skilled in the art various modifications and variations within the spirit and scope of the invention.

I claim:

1. In an optical image printer wherein images are copied from a first film onto a photographically sensitive second film, the improvement comprising in combination:

a relatively stationary structure having a bed and including means for providing electric energizing power;

a first carriage slidable along said bed;

a second carriage slidable along said bed;

a projector having a first apparatus including a first housing mounted on said first carriage for receiving said first film and first means in said first housing for positioning said received first film, said projector including means operatively associated with said first apparatus for illuminating said positioned first film and forming a luminous image;

a camera operatively associated with said projector and having a second apparatus including a second housing mounted on said second carriage for receiving said second film and second means in said second housing for positioning said received second film, said camera including means operatively associated with said second apparatus for receiving said luminous image from said projector and projecting said received luminous image onto said positioned second film;

first, second, third and fourth film magazines of identical construction for selectively supplying and receiving either of said first and second films, each of said first, second, third and fourth film magazines having an individual magazine housing, individual means for rendering said magazine housing light tight, an individual mounting shoe, individual means in the particular magazine housing for coiling either of said first and second films, an individual electric motor coupled to said coiling means for driving said coiling means, and means for mounting said electric motor on the particular magazine housing;

means for releasably mounting said first, second, third and fourth magazines, respectively, on a first side of said first housing, on an opposite second side of said first housing, on a first side of said second housing, and on an opposite second side of said second housing via the mounting shoes of said first, second, third and fourth magazines; and means coupled to the electric motor of each film magazine for selectively connecting each electric motor to said electric energizing power providing means.

2. Apparatus as claimed in claim 1, including:

a bracket structure connected to one of said housings for mounting said one housing on one of said carriages.

3. Apparatus as claimed in claim 2, wherein:

said releasable connecting means include an electric power outlet on said bracket structure, means connected to said electric energizing power providing means and to said electric power outlet for energizing said electric power outlet from said power providing means, an electric power plug insertable into said electric power outlet on said bracket structure, and a cable for connecting said electric power plug to one of said electric motors.

* * * * *